United States Patent [19]

Owen

[11] Patent Number: 5,263,183

[45] Date of Patent: Nov. 16, 1993

[54] RADIO ANTENNA TUNING CIRCUIT

[75] Inventor: Jeffrey R. Owen, Portland, Oreg.

[73] Assignees: Seiko Corp.; Epson Corp., both of Japan

[21] Appl. No.: 693,202

[22] Filed: Apr. 30, 1991

[51] Int. Cl.$^5$ .............................................. H04B 1/18
[52] U.S. Cl. .............................. 455/193.1; 455/193.3; 455/150.1; 455/196.1
[58] Field of Search ................. 455/129, 193.1, 193.3, 455/150.1, 197.2, 196.1, 191.2, 191.1, 182.2

[56] References Cited

U.S. PATENT DOCUMENTS

| | | | |
|---|---|---|---|
| 4,339,829 | 7/1982 | Dimon | 455/182.2 |
| 4,493,112 | 1/1985 | Bryene | 455/129 |
| 4,817,196 | 1/1989 | MacNak et al. | 455/193.1 |
| 4,837,852 | 6/1989 | Takada et al. | 455/197.1 |

Primary Examiner—Reinhard J. Eisenzopf
Assistant Examiner—Philip J. Sobutka
Attorney, Agent, or Firm—Elmer Galbi

[57] ABSTRACT

The present invention provides an antenna or preselector tuning method and circuit that tunes an antenna or preselector in a very short period of time. The circuit of the present invention does not rely on measuring the magnitude of the signal strength at the output of the receiver as do many prior art antenna tuning techniques. With the present invention a radio frequency (RF) oscillator set to the desired receiver frequency generates an excitation signal which is lightly coupled to the antenna tuned circuit through a network. A phase detector then compares the phase of signal established in the antenna tuned circuit with the phase of the excitation signal to produce an "error" signal indicative of the phase shift of the excitation signal as it passes through the network. Using this "error" signal and locked loop (PLL) techniques, an antenna tuning voltage is created that results in a zero phase shift through the network.

10 Claims, 3 Drawing Sheets (1)

RADIO ANTENNA TUNING CIRCUIT

FIELD OF THE INVENTION

The present invention relates to radio receivers and more particularly to an apparatus for tuning a radio receiver antenna or preselector.

BACKGROUND OF THE INVENTION

It is well known that the antenna or the preselector of a radio receiver must be properly tuned to achieve maximum sensitivity. The prior art shows a variety of circuits and techniques for tuning radio receiver antennas and preselectors.

For example, U.S. Pat. 4,837,852 (Takada) describes a circuit for implementing the conventional tracking approach to tuning an antenna wherein the same voltage that changes the frequency of the local oscillator changes the antenna tuning. A circuit diagram of a prior art tracking type of antenna tuning circuit is shown in FIG. 1 of this application.

U.S. Pat. 4,789,866 describes the use of varactor diodes to tune an antenna system to a desired frequency.

U.S. Pat. 4,381,566 describes a circuit for tuning a small sized high gain antenna by use of a distributed constant loading element combined with a tuning unit.

The problem of antenna tuning is particularly acute in small low power radio receivers such as those used in wristwatch pagers of the type shown in U.S. Pat. No. 4,713,808 (Gaskill). Such wristwatch radio paging devices use the wristband as an antenna, and differences in wrist size and variations in how the wristband is worn create significant tuning problems.

U.S Pat, No 4,817,196 (Macnak), U. S. Pat. No. 4,862,516 (Macnak) and co-pending application Ser. No. 07/279,952 (Gaskill) relate to tuning an antenna in a radio paging receiver which has a wristband antenna. The tuning techniques shown in these references rely on measuring the signal strength at the output of the receiver as the tuning is changed. The antenna is tuned so that the output signal is a maximum. Such circuits require a relatively long period of operation and sometimes they do not result in true optimum tuning.

SUMMARY OF THE INVENTION

The present invention provides an antenna or preselector tuning method and circuit that tunes an antenna or preselector in a very short period of time. The circuit of the present invention does not rely on measuring the magnitude of the signal strength at the output of the receiver as do many prior art antenna tuning techniques. With the present invention a radio frequency (RF) oscillator set to the desired receiver frequency generates an excitation signal which is lightly coupled to the antenna tuned circuit through a network. A phase detector then compares the phase of signal established in the antenna tuned circuit with the phase of the excitation signal to produce an "error" signal indicative of the phase shift of the excitation signal as it passes through the network. Using this "error" signal and phase locked loop (PLL) techniques, an antenna tuning voltage is created that results in a zero phase shift through the network.

DESCRIPTION OF A PREFERRED EMBODIMENT

Figure 1:
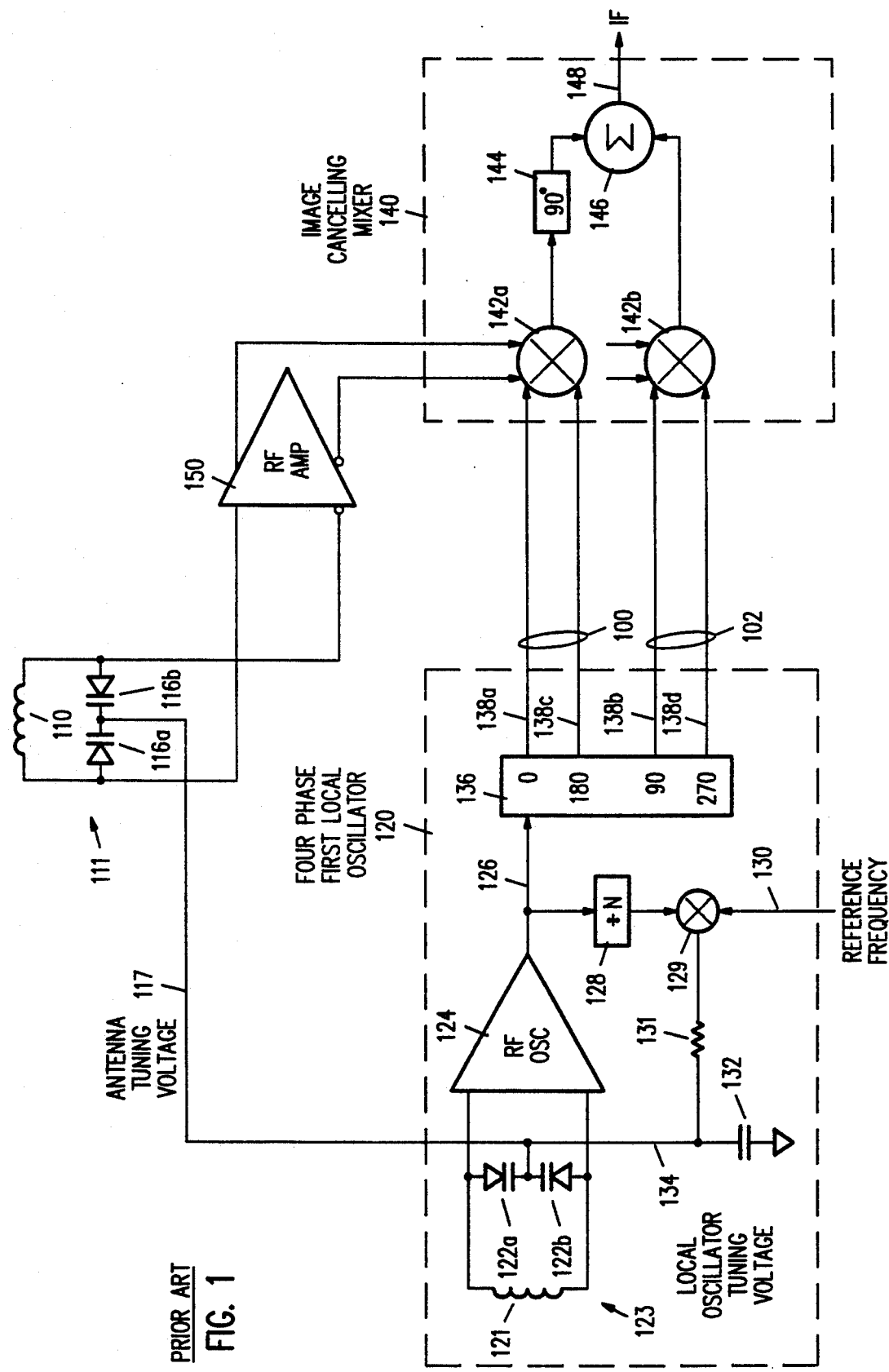
FIG. 1 is a block diagram of a prior art radio receiver.

The present invention will be described in the context of the prior art radio receiver shown in FIG. 1. The prior art receiver shown in FIG. 1 includes an antenna tuning circuit 111 consisting of an inductive or loop antenna 110 and two voltage variable capacitors (varactors) 116a and 116b, a local oscillator 120, a radio frequency (RF) amplifier 150, and an image cancelling mixer 140. Local oscillator 120 receives a reference frequency signal on line 130. Local oscillator 120 includes a programmable frequency divider circuit 128 which is used to set the local oscillator 120 to a desired frequency in a manner conventional to synthesized local oscillators.

The prior art circuit shown in FIG. 1 operates as follows: The divider circuit 128 is set to a value that produces the local oscillator frequency needed to tune the receiver to a particular frequency. Setting divider 128 to a particular value causes a particular local oscillator tuning voltage to be developed on line 134. The tuning voltage 134 is connected to (or ganged with) the antenna tuning voltage 117 which controls antenna tuning circuit 111. Thus as the receiver is tuned to a particular frequency by programming the local oscillator, the antenna is track tuned to the same frequency. The output of the antenna is amplified by RF amplifier 150 and then mixed with the output of local oscillator 120 by the image cancelling mixer 140. The result is the generation of an appropriate intermediate frequency (IF) signal on line 148.

In order for the circuit shown in FIG. 1 to operate properly, the values and characteristics of inductors 110 and 121, and varactors 116 and 122 must be properly chosen and matched so that they "track" in frequency as the tuning voltage 134 (117) is varied. With a wristwatch radio receiver of the type shown in U.S. Patent 4,713,808 (Gaskill) it is not possible to precisely know the values and characteristics of the loop antenna 110 at the time the circuit is designed since loop antenna 110 is in the form of a wristband which has characteristics that are dependent on the user adjustable size of the wristband and how tightly the wristband is being worn by a particular user.

The circuitry in antenna tuning circuit 111, local oscillator 120, and image cancelling mixer 140 are conventional; however, since they are relevant to the later description of the present invention they will be briefly described. Local oscillator 120 operates as a phase locked loop. It includes a tank circuit 123 which consists of inductor 121 and varactors 122a and 122b. The oscillation frequency of tank circuit 123 is controlled by the voltage on line 134. The RF oscillator 124 is an amplifier that provides the reflection gain necessary to cause the tank 123 to oscillate and produces an output 126 with sufficient power to drive the programmable frequency divider 128 and the four phase generator 136. The output of the frequency divider 128 is applied along with a reference frequency 130 to a phase detector 129.

The output of the phase detector 129 is low pass filtered with resistor 131 and capacitor 132 to produce the local oscillator tuning voltage 134, thus closing the loop. The four phase generator 136 produces four outputs 138a, 138b, 138c and 138d, each containing a signal at the same frequency but with a different 90 degree phase. Signals 138a and 138c can be considered together as an in-phase differential output 100, and signals 138b and 138d can be considered together as a quadrature-phase differential output 102.

Image cancelling mixer 140 includes two mixer circuits 142a and 142b each having one of their two differential inputs connected to the RF amplifier 150. The other input of each of the two mixers 142 is connected to the local oscillator 120: mixer 142a is fed from the in-phase output 100, and mixer 142b is fed from the quadrature-phase output 102. The output of mixer 142a is then phase shifted by 90 degrees in phase shifter 144 and added to the output of mixer 142b by summing circuit 146 to produce the IF frequency output 148. The operation of these components is conventional.

Figure 2:
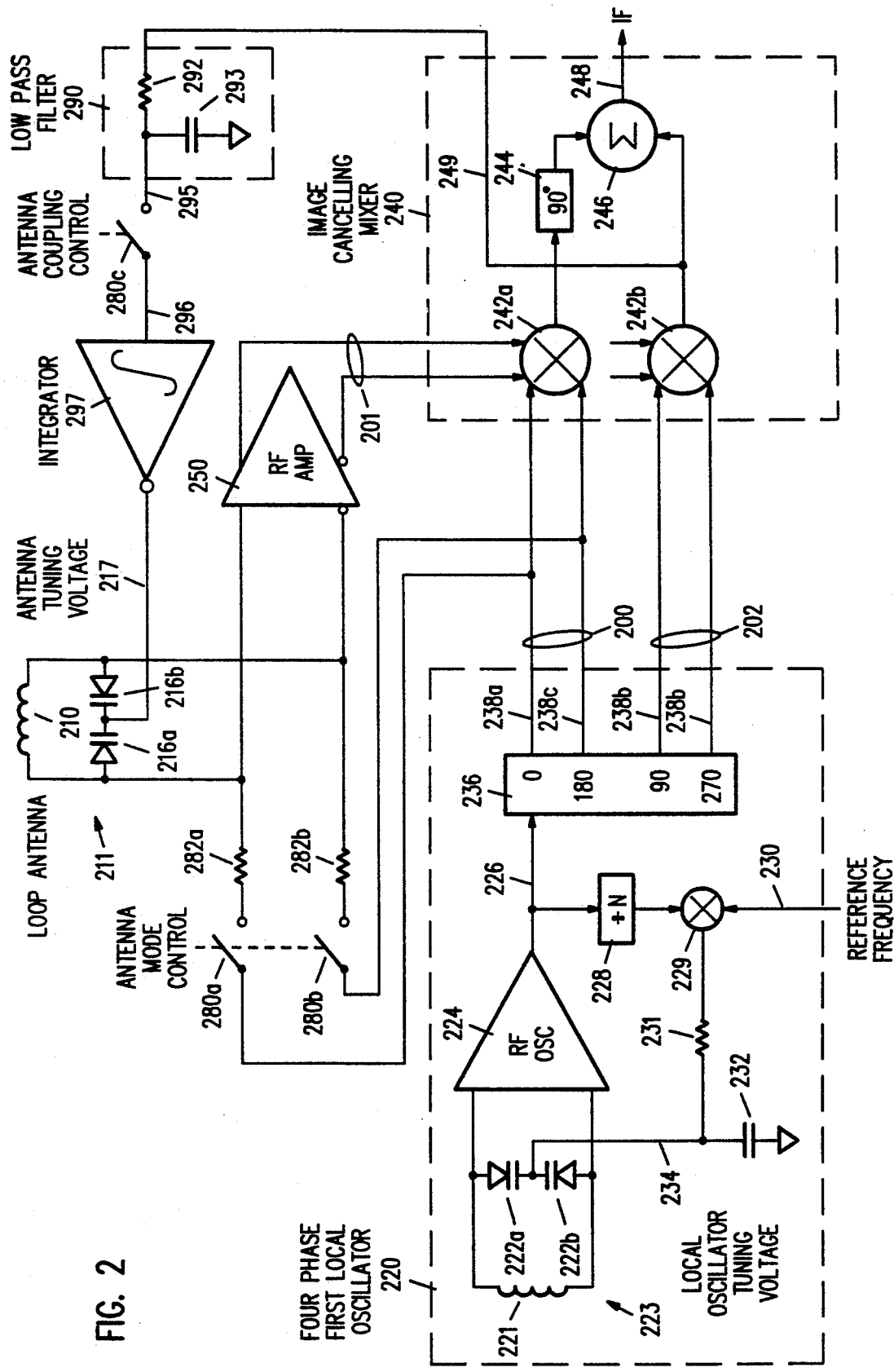
FIG. 2 is a block diagram of a preferred embodiment of the present invention.

The circuit of the present invention is shown in FIG. 2. As shown in FIG. 2, the circuit consists of an antenna tuning circuit 211 consisting of an inductive or loop antenna 210 and two varactors 216a and 216b, a local oscillator 220, RF amplifier 250, and an image cancelling mixer 240. Each of these components are similar to and operate in the same manner as the corresponding components shown in FIG. 1.

The circuit shown in FIG. 2 also includes, mode control switches 280a, 280b and 280c, a high impedance resistive network consisting of two resistors 282a and 282b, a low pass filter 290, and an inverting integrator 297.

The difference between the circuit shown in FIG. 2 and the prior art circuit shown in FIG. 1 is that in the circuit shown in FIG. 2, the antenna tuning signal 217 is generated by the mixer circuit 242b in conjunction with the low pass filter 290 and the integrator 297. Furthermore, with the circuit shown in FIG. 2, the antenna tuning operation is an intermittent operation rather than a continuous operation as is the case with the circuit shown in FIG. 1. In the circuit shown in FIG. 2, tuning only takes place when switches 280a, 280b and 280c are closed, when the switches are open the integrator 297 will hold its output the antenna tuning voltage 217 constant. It is noted that the intermittent nature of the tuning is not of itself a novel aspect of the present invention. An intermittent tuning operation takes place in the circuit shown in copending application Ser. No. 07/279,952 (Gaskill).

The circuit shown in FIG. 2 has two modes of operation term the "receiver mode" and the "tuning mode". In the receiver mode, the switches 280a, 280b and 280c are opened and the circuit operates as a conventional receiver. In the receiver mode, the receiver is set to receive a particular frequency by setting the divider 228 to a value such that the local oscillator 220 generates a signal equal to the particular desired frequency plus (or minus) the 10.7 MHz (typical) IF frequency. This is a conventional manner of operating a superhetrodyne receiver.

In the "tuning mode" switches 280a, 280b and 280c are closed. During the tuning mode, the divider 228 is set to a value such that the local oscillator 220 generates a signal equal to the particular desired frequency, that is the frequency to which it is desired to tune the antenna.

The present invention takes advantage of the fact that mixer circuits 242a and 242b operate as a phase detectors when signals of the same frequency are applied to both inputs of the mixer and the output of the mixer is subsequently low pass filtered to remove the second harmonic. Since this type of multiplying phase detector outputs a zero value when the two input signals are in quadrature (have a 90 degree phase difference), mixer 242b is used for phase detection since it is fed from the quadrature-phase output 202 of the local oscillator 220. In the tuning mode when switches 280a and 280b are closed, the in-phase output 200 of the local oscillator 220 is lightly coupled to the antenna tuning circuit 211 through high impedances 282a and 282b. The signal established across the antenna tuning circuit 211 is in turn applied the phase detector mixer 242b through amplifier 250. The output 249 of the phase detector mixer 242b is filtered by low pass filter 290, and integrated by circuit 297 to generate an antenna tuning voltage on line 217.

Low pass filter 290 consists of a resistor 292 and a capacitor 293. Low pass filter 290 and inverting integrator 297 are conventional and will not be explained further.

Figure 3A:
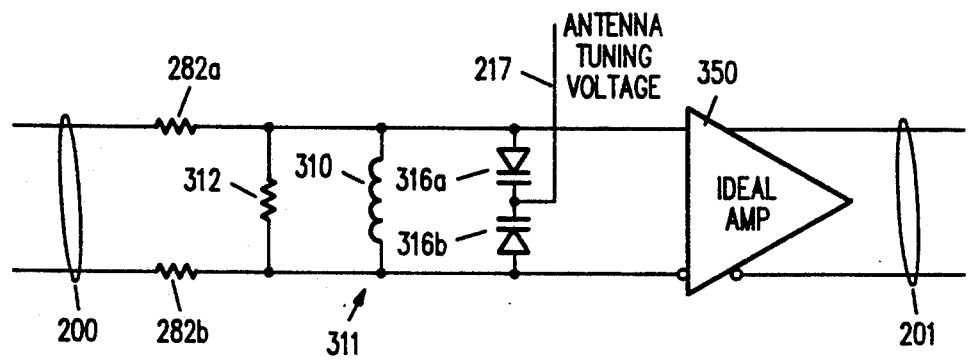
FIG. 3A is an equivalent circuit that models the high impedance network and the antenna tuning circuit shown in FIG. 2.

The operation of the circuit while in "tuning mode" will be explained by reference to the simplified diagram shown in FIG. 3A and the associated curves shown in FIGS. 3B, 3C and 3D.

The loop antenna 210, the varactors 216a and 216b, the RF amplifier 250 and their interconnecting wires all have resistances associated therewith. In the equivalent circuit shown in FIG. 3A, the total effect of all these resistances is approximated by the inclusion of a single resistance 312. The inductance 310 is the pure inductance of the loop antenna 210 and the capacitances 316a and 316b are the pure capacitance of varactors 216a and 216b. The ideal amplifier 350 has infinite input impedance and zero delay.

Figure 3B:
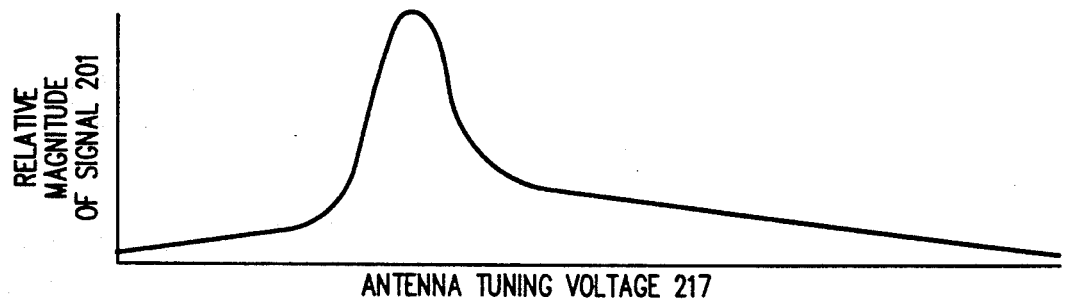
FIGS. 3B and 3C show how the signal established in the antenna tuning circuit of FIG. 3A vary with the antenna tuning voltage.
Figure 3C:
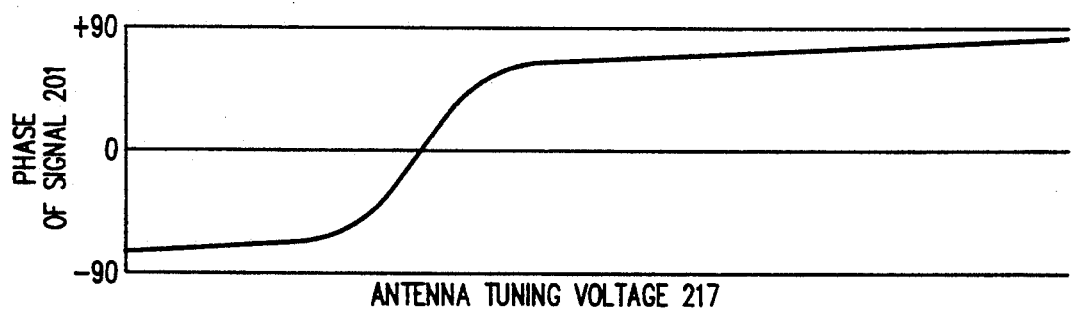
Figure 3D:
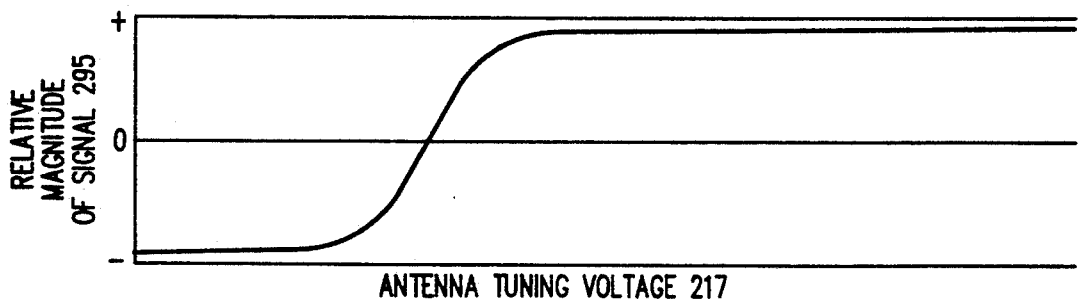
FIG. 3D shows how the output of the phase detector varies with antenna tuning voltage.

With an RF signal of constant frequency and amplitude applied to input 200, FIGS. 3B and 3C show the magnitude and phase shift respectively of the signal on the output 201 as the tuning voltage 217 is varied. It is noted that the particular tuning voltage that produces the greatest magnitude of the output signal as shown in FIG. 3B is the same tuning voltage which produces an output signal with zero phase shift as shown in FIG. 3C. FIG. 3D shows the magnitude of the signal 295 as the tuning voltage 217 is varied. Signal 295 is derived by passing the output 249 of the mixer 242b through low pass filter 290 to remove the second harmonic. It is noted that in FIG. 3D the signal 295 goes to zero at the same particular antenna tuning voltage 217 where in FIG. 3C there is zero phase shift through the antenna tuning circuit, and where in FIG. 3B there is peak output voltage, that is when the antenna is properly tuned. By closing switch 280c and connecting signal 295 to the antenna tuning voltage 217 through inverting integrator 297, a phase locked loop is created that will adjust the antenna tuning voltage 217 until the signal 295 has zero value, i.e. until the antenna is properly tuned. For instance, if the antenna tuning voltage 217 is initially too low, the signal 295 will be negative. A negative input on the inverting integrator 297 will cause its output, the antenna tuning voltage 217, to increase. Conversely, if the antenna tuning voltage is too high, the signal 295 will be positive, and the output of the inverting integrator 217 will decrease. If the loop is stable, the antenna tuning voltage 217 will converge to the desired voltage as the signal 295 converges to zero. The conditions required for phase lock loop stability are well understood and will not be elaborated herewithin.

The above explanation assumes that the ideal amplifier 350 has zero delay. In fact there will be some time delay in the real amplifier 250. This time delay will slightly shift the location of the zero of the phase in FIG. 3C and of the zero of the signal 295 in FIG. 3D relative to the maximum magnitude in FIG. 3B. If uncorrected, this will cause a slight error in the tuned frequency of the antenna, which may be acceptable in some applications. Else, this effect can be compensated for by a number of techniques such as adding an equal delay between the local oscillator 220 and the mixer 240. Alternatively, this effect can be approximately compensated for by making the high impedances 282 partially reactive or by programming the local oscillator 220 to a frequency slightly offset from the exact frequency desired during the tuning operation. The amount of offset needed can be determined by a trial and error procedure. These techniques can also be used to present amplifier 250 with a desired reactive impedance on its input selected for best noise performance.

Among the advantages of the circuit shown in FIG. 2 is that it can tune the antenna in a very short time, it does not require a peak detector as do certain of the prior art circuits, it uses the normal image cancelling mixer circuit 240 as a phase detector to determine when the antenna is tuned. Thus the present invention utilizes existing components in the receiver to operate in a different manner during the tuning operation with a net saving of components. Furthermore, the circuit of the present invention does not depend upon an external radio signal to generate an output signal from the receiver which is then detected. One can not predict the characteristics of an outside signal and this introduces variations into the operation of the circuit. With the circuit shown in FIG. 2, the antenna is tuned using an internally generated signal, which is generated by the existing local oscillator circuit. Thus the action of the present circuit is more predicable and reliable. It is noted that tuned circuits have their maximum magnitude response at essentially the same frequency as that resulting in a zero phase shift, hence, with the present invention the antenna is closely tuned to the desired frequency. An example of circuit operation follows: Assume that it is desired to tune to a radio station at 101.5 MHz. It is therefore required to adjust the antenna tuned circuit so that the receiver will have maximum sensitivity to a signal at 101.5 MHz during the "tuning mode". The local oscillator 220 is set to 101.5 MHz and switches 280a, 280b and 280c are closed. A non-zero voltage will appear on signal 295 until the phase shift through the high impedance network 282 into the antenna tuned circuit 211 equals zero. A non-zero voltage on signal 295 causes integrator 297 to adjust the voltage on line 217, thereby changing the antenna tuning. When the voltage on signal 295 settles to zero, the antenna will be tuned to the desired frequency. This tuning process will require less than a millisecond. When the voltage on signal 295 has settled to zero (or after a fixed time interval) the "receiver mode" is entered by opening switches 280a, 280b and 280c, and setting the local oscillator 220 to 112.2 MHz which is the desired receiver frequency 101.5 MHz plus the IF frequency 10.7 MHz.

It should also be understood that various changes may be made in the arrangement of steps and apparatus heretofore set forth in the specification and drawings. Such changes may be made without departing from the spirit and scope of the invention as defined in the following claims.

Applicants invention extends to all the various embodiments of the invention which are defined by the following claims.

We claim:

1. The method of tuning the antenna system of a radio receiver to a desired RF frequency, said radio receiver including an RF oscillator which produces an RF test signal, means for tuning said antenna, and a phase detector circuit, including the steps of:
   setting said RF oscillator to said RF frequency,
   coupling said RF test signal to said antenna through an impedance network,
   applying the output of said antenna and the output of said RF oscillator to said phase detector circuit, whereby the output of said phase detector indicates the phase shift produced on said RF test signal by said antenna and said impedance network,
   using the output of said phase detector circuit to control said antenna tuning circuit,
   whereby said antenna tuning circuit is set to a value such that the phase shift produced by said antenna to said RF test signal is zero, said antenna thereby being tuned to said desired frequency.

2. The method recited in claim 1 wherein said radio receiver is an FM receiver.

3. The method recited in claim 1 wherein said oscillator is a phase locked loop.

4. The method recited in claim 1 wherein said phase detector circuit is am image cancelling mixer circuit.

5. The method recited in claim 1 including operating said receiver in a receiving mode and periodically switching to a tuning mode where said tuning steps are performed.

6. A system for tuning the antenna of a radio receiver to a desired RF frequency, said radio receiver including an RF oscillator which produces an RF test signal, means for tuning said antenna, and a phase detector circuit, including;
   means for setting said RF oscillator to said desired RF frequency,
   means for coupling said RF test signal to said antenna through an impedance network,
   means for applying the output of said antenna and the output of said RF oscillator to said phase detector circuit, whereby the output of said phase detector indicates the phase shift produced on said RF test signal by said antenna and said impedance network,
   means for controlling said antenna tuning circuit in response to the output of said phase detector circuit,
   whereby said antenna tuning circuit is set to a value such that the phase shift of said RF test signal produced by said antenna to said frequency is zero and whereby said antenna is tuned to said desired RF frequency.

7. The system recited in claim 6 wherein said oscillator is a phase locked loop.

8. The method recited in claim 6 wherein said phase detector circuit is am image cancelling mixer circuit.

9. The system recited in claim 6 including means for operating said receiver in a receiving mode and for periodically switching to a tuning mode during which said antenna is tuned.

10. A method of operating a radio receiver to receive a desired RF frequency, said radio receiver including an antenna, an RF oscillator which produces an RF test signal, means for tuning said antenna, and a phase detector circuit, said method having an antenna tuning mode followed by a receiver mode, said antenna tuning mode comprising the steps of:

setting said RF oscillator to said desired RF frequency, coupling said RF test signal to said antenna through an impedance network, applying the output of said antenna and said RF test signal to said phase detector circuit, whereby the output of said phase detector indicates the phase shift produced by said antenna on said RF test signal, using the output of said phase detector circuit to control said antenna tuning circuit, whereby said antenna tuning circuit is set to a value such that the phase shift produced by said antenna on said RF test signal is zero and whereby said antenna is tuned to said desired frequency.

* * * * *